J. H. JONES.
SCALE.
APPLICATION FILED OCT. 3, 1913.

1,113,014.

Patented Oct. 6, 1914.
3 SHEETS—SHEET 1.

Witnesses

Inventor
J. H. Jones,
By Victor J. Evans
Attorney

J. H. JONES.
SCALE.
APPLICATION FILED OCT. 3, 1913.
1,113,014.
Patented Oct. 6, 1914.
3 SHEETS—SHEET 2.
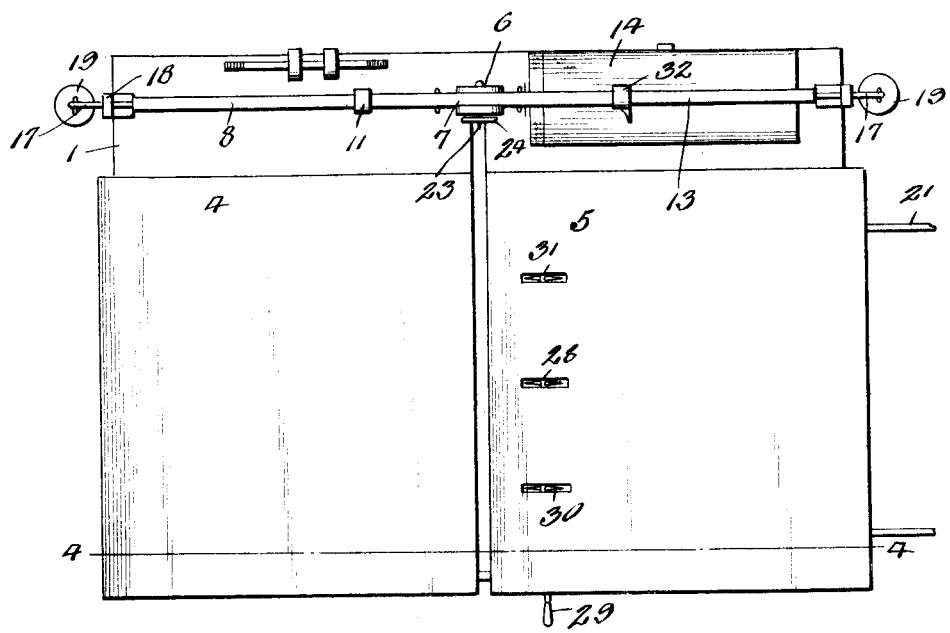
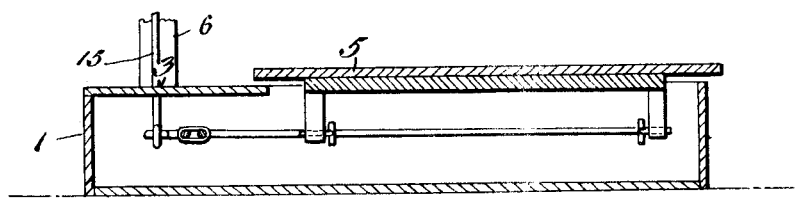
Witnesses
Inventor
J. H. Jones,
By Victor J. Evans
Attorney J. H. JONES.
SCALE.
APPLICATION FILED OCT. 3, 1913.
1,113,014.
Patented Oct. 6, 1914.
3 SHEETS—SHEET 3.
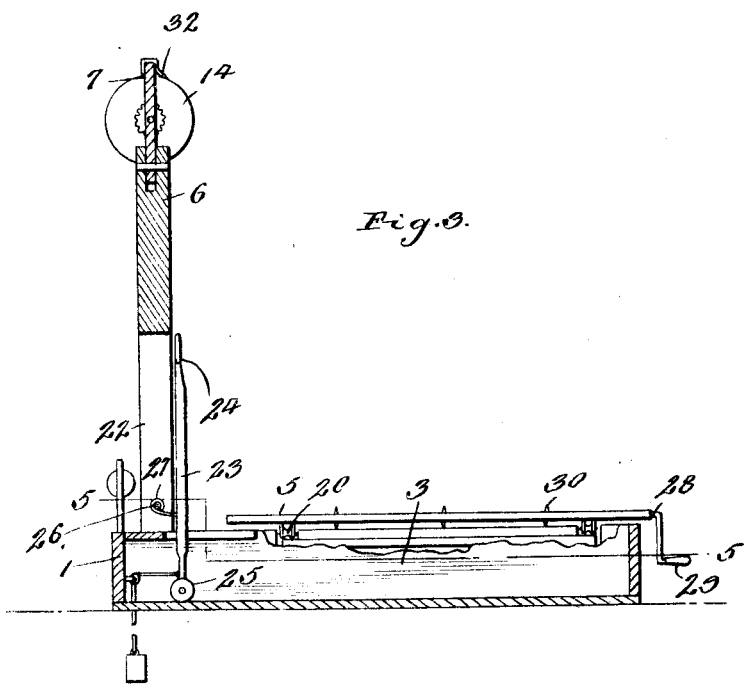
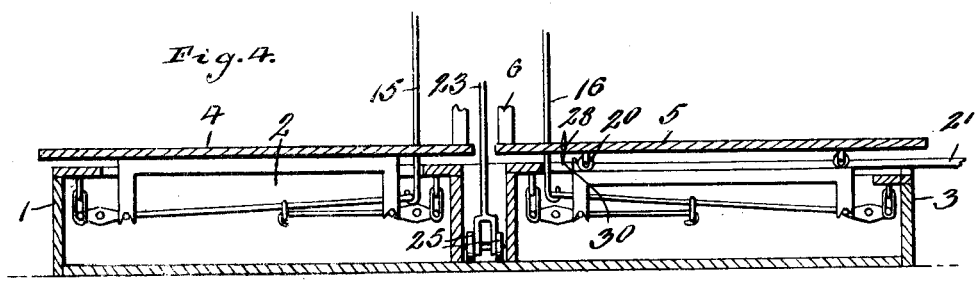
Witnesses
Inventor
J. H. Jones,
By Victor J. Evans
Attorney

UNITED STATES PATENT OFFICE.

JACK H. JONES, OF MOUNT ENTERPRISE, TEXAS.

SCALE.

1,113,014.  Specification of Letters Patent.  Patented Oct. 6, 1914.

Application filed October 3, 1913. Serial No. 793,237.

*To all whom it may concern:*

Be it known that I, JACK H. JONES, a citizen of the United States, residing at Mount Enterprise, in the county of Rusk and State of Texas, have invented new and useful Improvements in Scales, of which the following is a specification.

The invention relates to an improved scale, in the use of which any desired quantity of material can be accurately cut from the main section of the material without loss, whereby to provide a scale which is particularly useful in delivering to a customer any desired quantity of meat for instance, which is to be cut from the larger piece.

The main object of the present invention is the provision of a scale including two platforms and a centrally hung beam having its opposite ends controlling one of the platforms, one side of the scale beam being controlled by sliding weights and the other by a computing weight cylinder, a cutter being arranged to travel between the platforms to sever material at an indicated point.

The invention in its preferred form of details will be described in the following specification, reference being had particularly to the accompanying drawings, in which:—

Figure 1:
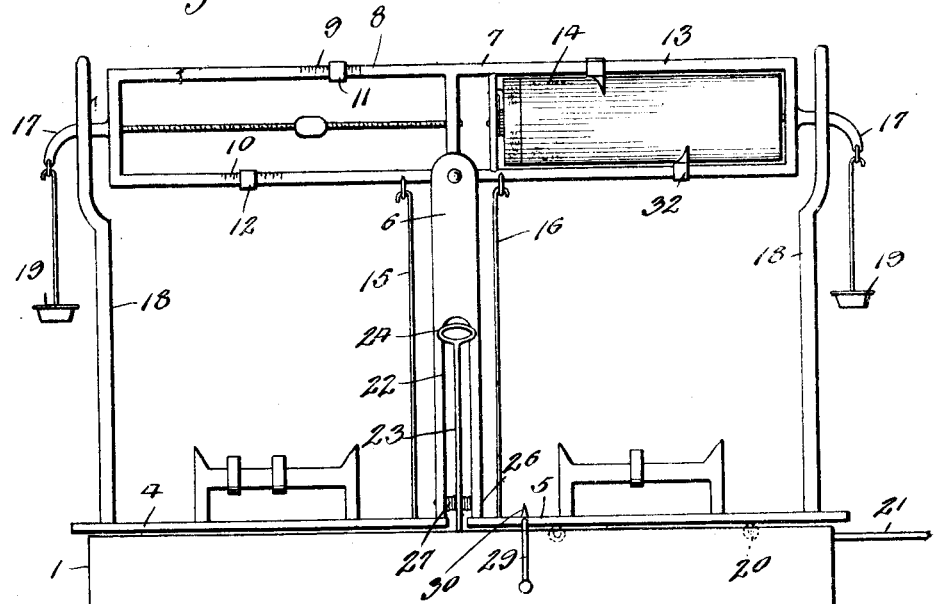
Figure 5:
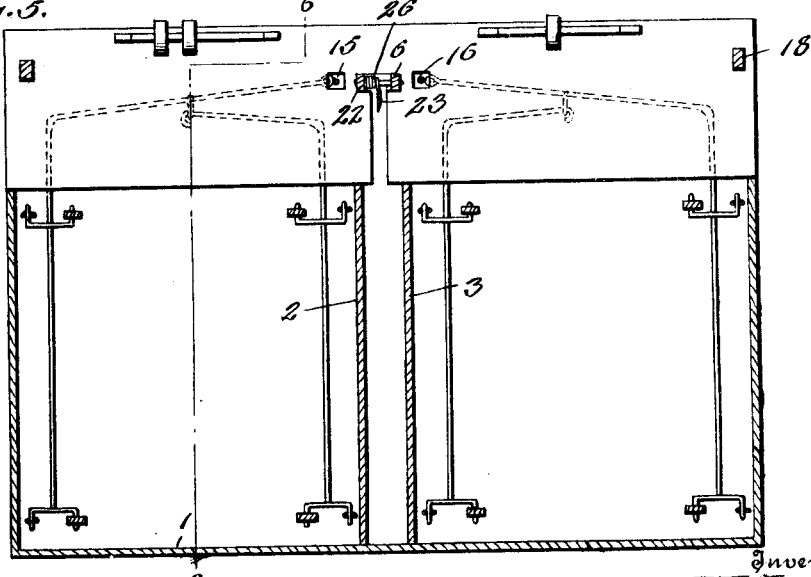

Figure 1 is a perspective view of the improved scale. Fig. 2 is a horizontal section. Fig. 3 is a central vertical section. Fig. 4 is a section on line 4—4 of Fig. 2. Fig. 5 is a section on line 5—5 of Fig. 3. Fig. 6 is a section on line 6—6 of Fig. 5.

In the accompanying drawings, the improved scale comprises the usual base frame 1 which in this instance is of a size to support duplicate casings 2 and 3 in which are housed duplicate weighing mechanisms coöperating with distinct platforms 4 and 5. Secured centrally of the frame and beyond the platform is an upright 6 on which is pivotally supported in the usual manner what may be termed a double scale beam 7, one end of the beam, as 8, having graduated sections 9 and 10 carrying sliding weights 11 and 12. The remaining portion 13 of the scale beam is provided with the usual computing weight cylinder 14. The section 8 of the scale beam is connected by a rod 15 with the mechanism of the platform 4, while the section 13 of the beam is connected by a similar rod 16 with the mechanism of the platform 5. Therefore in the weighing operation, the section 8 controls the platform 5, while the section 13 controls the platform 4. The respective ends of the beam are provided with arms 17 guided in uprights 18 rising from the base frame 1, the arms being terminally formed for the reception of balancing weights 19 for the usual purpose.

The platform 5 is provided on its under surface with rollers 20 and the base frame 1 beyond the outer edge of said platform 5 is provided with tracks 21 with which the rollers 20 are designed to coöperate, thus providing a means whereby the platform 5 may be moved to a position laterally of the operative position to receive an article to be weighed as a section of meat, or the like. The central upright 6 is formed to provide an elongated opening 22, and normally housed therein is a knife or cutter 23. The upper end of the knife or cutter is provided with an operating handle 24 while the lower end is provided with guiding rollers 25 adapted to travel between the casings 2 and 3, the arrangement being such that the knife travels immediately adjacent what may be termed the inner edge of the platform 4. A spring roller 26 is mounted in the opening 22 and has flexible connectors 27 wound about the same and terminally connected to the knife, so that as the knife is drawn forward it places the spring roller under tension, with the effect to return the knife to normal position when the pull thereon has been released.

Rotatably mounted in the casing 3 near the relatively inner edge of the platform 5 is a rod 28, operated by the handle 29 secured on one end thereof. The rod is provided with spur projections 30, which operate through slots 31 in the platform 5.

In use, assuming for example that it is desired to cut 40 cents' worth of bacon from a piece, with the price at 13 cents per pound. The whole piece is placed upon the platform 5 and the weights 11 and 12 adjusted until the weight of the entire piece is balanced. The computing cylinder is then adjusted until it indicates the price per pound, 13 cents, and the weights 32 coöperating therewith are moved to the amount, 40 cents. The scales are then off balance to exactly the desired weight of bacon to be cut from the piece. By means of the rod 28 the piece of bacon is then moved on to the platform 4 until there is an exact balance of the beam 7. The knife is then moved forward to sever the piece resting upon the platform 4, which will be exactly the weight of bacon to be sold at 40 cents at the rate of 13 cents per pound. The coöperation of the platform 5 with the tracks 21 eliminates the necessity for carrying or dragging the meat to the scale, as the platform can be shifted laterally to the place where the meat may be piled and the latter moved by the usual hook on to the platform.

The improved scale is particularly useful in weighing meats or the like, though it is apparent that either platform may be independently used for weighing any desired commodity.

What is claimed is:—

1. A scale including a plurality of platforms, a single beam centrally pivoted, sliding weights coöperating with one side of the beam, a computing cylinder coöperating with the opposing side of the beam, connections between the respective sides of the beam and the respective platforms, a knife operative between the platforms, one of the platforms being laterally movable with respect to its normal position.

2. A scale including a plurality of platforms, a single beam centrally pivoted, sliding weights coöperating with one side of the beam, a computing cylinder coöperating with the opposing side of the beam, connections between the respective sides of the beam and the respective platforms, a knife operative between the platforms, one of the platforms being laterally movable with respect to its normal position, and a track for supporting the laterally movable platform beyond its normal position.

3. A scale including a plurality of platforms, a single beam centrally pivoted, sliding weights coöperating with one side of the beam, a computing cylinder coöperating with the opposing side of the beam, connections between the respective sides of the beam and the respective platforms, a knife operative between the platforms, and means operating beneath one of the platforms for shifting the material thereon toward the other platform.

In testimony whereof I affix my signature in presence of two witnesses.

JACK H. JONES.

Witnesses:
C. M. LANGFORD,
L. D. JONES.